United States Patent [19]

Hilton

[11] Patent Number: 5,107,541
[45] Date of Patent: Apr. 21, 1992

[54] METHOD AND APPARATUS FOR CAPTURING INFORMATION IN DRAWING OR WRITING

[75] Inventor: Colin S. Hilton, London, England

[73] Assignee: National Research Development Corporation, London, England

[21] Appl. No.: 548,192

[22] Filed: Jul. 5, 1990

Related U.S. Application Data

[63] Continuation of Ser. No. 137,676, Dec. 24, 1987, abandoned, which is a continuation-in-part of Ser. No. 76,209, Jun. 30, 1987, abandoned.

[30] Foreign Application Priority Data

| Nov. 5, 1985 | [GB] | United Kingdom | 8527265 |
|---|---|---|---|
| Nov. 25, 1985 | [GB] | United Kingdom | 8528931 |
| Mar. 24, 1986 | [GB] | United Kingdom | 8607207 |

[51] Int. Cl.$^5$ ............................................. G06K 9/00
[52] U.S. Cl. ........................................ 382/3; 178/18; 382/13; 382/59; 382/65
[58] Field of Search ................ 382/3, 13, 59, 58, 65, 382/2, 12; 178/17-19

[56] References Cited

U.S. PATENT DOCUMENTS

| 3,903,502 | 9/1975 | Moss | 382/3 |
|---|---|---|---|
| 3,955,178 | 5/1976 | Warfel | 382/3 |
| 4,078,151 | 3/1978 | McNeary | 178/18 |
| 4,122,435 | 10/1978 | Greenway | 382/3 |
| 4,150,285 | 4/1979 | Brienza et al. | 358/107 |
| 4,227,044 | 10/1980 | Fencl | 178/19 |
| 4,433,436 | 2/1984 | Carnes | 382/3 |
| 4,475,240 | 10/1984 | Brogårdh et al. | 382/3 |
| 4,560,830 | 12/1985 | Perl | 178/19 |
| 4,581,482 | 4/1986 | Rothfjell | 382/3 |

FOREIGN PATENT DOCUMENTS

| 0035036 | 9/1981 | European Pat. Off. . |
|---|---|---|
| 0094867 | 11/1983 | European Pat. Off. . |
| 0132241 | 1/1985 | European Pat. Off. . |
| WO86/04704 | 8/1986 | PCT Int'l Appl. . |
| 860254 | 2/1961 | United Kingdom . |
| 1012445 | 12/1965 | United Kingdom . |
| 1233335 | 5/1971 | United Kingdom . |
| 1290398 | 9/1972 | United Kingdom . |
| 1376742 | 12/1974 | United Kingdom . |
| 1480066 | 7/1977 | United Kingdom . |
| 1525259 | 9/1978 | United Kingdom . |
| 1528578 | 10/1978 | United Kingdom . |
| 2117154A | 10/1983 | United Kingdom . |
| 2154734A | 9/1985 | United Kingdom . |

OTHER PUBLICATIONS

Darringer et al., "Speed Pen", IBM Tech. Disc. Bulletin, vol. 18, No. 7, 12/1975, pp. 2374-2375.
Bajorek, "Signature Recognition System Transducers" IBM Tech. Disc. Bulletin, vol. 18, No. 10, 3/1976, p. 3484.
IBM Technical Disclosure Bulletin, vol 27, No. 11, Apr. 1985, pp. 6537-6539, New York, U.S.; "Electro-Optical Cursor Controller".

Primary Examiner—Joseph Mancuso
Attorney, Agent, or Firm—Cushman, Darby & Cushman

[57] ABSTRACT

Obtaining data for signature recognition or data entry are relatively expensive because the apparatus used at each entry point is fairly complex. The present invention employs a relatively inexpensive pen which may be a ball pen with a transparent ball, an ink reservoir, a light sensitive device and an analyzing circuit. Either the circuit or apparatus coupled to the pen is arranged to analyze, on a temporal basis, light received by the light sensitive device which has been modulated as the pen is used to write on closely lined paper. Alternatively, the pen may contain storage and transmit data for external analysis. The analysis can be used, for example, in signature verification or data entry. Other forms of inexpensive devices for obtaining data using pens writing on lined paper are described.

15 Claims, 4 Drawing Sheets

METHOD AND APPARATUS FOR CAPTURING INFORMATION IN DRAWING OR WRITING

This is a continuation of application Ser. No. 137,676, filed on Dec. 24, 1987 which was abandoned upon the filing hereof which is a continuation in-part of application Ser. No. 76,209 filed Jun. 30, 1987 which is now abandoned.

BACKGROUND AND SUMMARY OF THE INVENTION

The present invention relates to methods and apparatus for generating signals as writing or drawing is carried out, the signals being dependent on the way in which the writing or drawing is carried out.

Signature verification methods are known in which the dynamic characteristics of the signature (characteristics obtained while the signature is being written) are used in signature verification. The present invention is expected to be particularly useful in such signature verification systems, these systems being of application to monetary transfers and data entry, for example.

Apparatus for identifying characteristics of handwriting by moving a pen across a ridged writing surface is described in U.S. Pat. No. 4,122,435 and similar apparatus for signature verification is described in U.S. Pat. No. 3,955,178. The same principle is used in the signature verifier described in the IBM Technical Disclosure Bulletin, Volume 18, No. 7, Dec. 1975. A disadvantage of this method is the complexity of equipment required to sense the vibrations set up when the pen crosses a groove.

A known alternative which also suffers from the disadvantage of complexity is passing electrical signals into a grid of electrical conductors, the signals being representative in some way of the position of a conductor in the grid, and sensing signals using a pen whose position is to be determined. An example of such apparatus is described in U.S. Pat. No. 4,560,830. Other alternatives are described in European Patent Specifications 0132241 and 0035036.

According to a first aspect of the present invention there is provided a method of obtaining information as writing or drawing is carried out, comprising the steps of writing or drawing in relation to a surface marked in a predetermined way using a tip of an instrument which causes a trail to be left which can be traced later, continually sensing for the tip crossing any of the marks, the sensing being carried out electromagnetically, and analyzing the mark crossings on a temporal basis.

The main advantages of this method are that a visual trace of any writing carried out is left so that, if necessary, it can be checked later by eye; and that temporal analysis allows the writing instrument, processor and paperwork to be simple and inexpensive. Temporal analysis also has advantages as far as signature recognition is concerned: the dynamic features of a signature can be recognized and the signature cannot usually be reconstructed.

The surface may be marked by projecting light to provide light and dark areas forming a predetermined arrangement of marks on to the said surface. Thus the surface may be unmarked until the light and dark areas are projected on to it for example by projecting an image or partially masking the light, and remains marked only while light projection continues.

Sensing may be carried out by receiving electromagnetic radiation, visible or invisible, which is modulated when a said mark is crossed. The modulation may, for example, occur either by interruption if light is transmitted through the surface, or by reflection if light is reflected from the surface. Alternatively sensing may be carried out by electromagnetic induction when the lines are formed by material which has substantial magnetic properties and the instrument contains means for detecting such material.

Radiation sensed may be used to derive a representative signal in the writing instrument, or the radiation may be transmitted by way of an optical fiber, for example, to a sensor elsewhere.

The tip may be out of contact with the surface when writing or drawing is carried out but preferably it is in contact with the surface and cooperates with the surface to leave a trail which can be traced later. To this end the tip may dispense ink or a pencil lead type material (either of which can be visible or invisible) or the surface may be such that the tip marks the paper either visibly or invisibly, for example by the use of paper containing material which is released when pressure is applied, conventional carbon paper or similar papers or by the use of a surface such as, or similar to, slate or wax which is marked by the tip.

Where ink or a pencil lead like substance is used and sensing mark crossings depends on receiving electromagnetic radiation, either any ink or pencil-like substance chosen is transparent or translucent to the radiation but not to the marks on the surface, or the light receiver is positioned to prevent the radiation received being substantially interrupted by ink or a pencil lead-type substance dispensed by the tip.

Where ink is used which is not visible in ambient light, it may be of the type which can be seen in electromagnetic radiation of appropriate wavelength or of a type which can be developed by application of a suitable developer or by heating.

The marks on the surface may or may not be visible depending, for example on their position or on the wavelengths of light interrupted by crossing the marks. The marks may be lines and when lines are used there is preferably at least one set of the said lines in which the lines are parallel to one another.

In another example of the invention the writing instrument may contain as before, a light sensitive device but the surface may be illuminated by light having a particular wavelength either from above or below so reducing spurious modulation of ambient light received in sensing mark crossings. As an alternative in overcoming spurious modulation, light from the source may be chopped at a particular frequency and the light sensitive device may include a filter to extract a signal at this frequency.

In an alternative embodiment the writing instrument may contain a light source and the surface, except for the marks, may be transparent or translucent to the light, and the method then including receiving light passed from the writing instrument through the surface, or reflected from the surface, while writing or drawing is carried out.

According to a second aspect of the present invention there is provided a writing instrument comprising a tip for the instrument which interacts with a surface on which writing or drawing is carried out to allow the path of the instrument to be traced after the instrument has been removed, and a light source and/or light sensitive device, for transmitting or receiving light from the surface at the point where the said tip makes contact with the surface.

An advantage of such a writing instrument is that since light is transmitted or received where the tip makes contact, accurate data sensing results because there is no displacement or parallax between the sensing point and the tip.

Preferably the tip is formed by a spherical transparent ball point, such as glass, or suitable gem-stone material, which forms a convex-convex lens which greatly enhances light pick up at the point of contact. The instrument may then include a light guide between the ball point and the light sensitive device.

The tip may dispense an ink or equivalent as described above or it may be suitable for marking a surface by indentation or by releasing material in, or under, the surface.

The writing instrument may contain a circuit connected to the light sensitive device for storing and/or analyzing signals received from the light sensitive device. Where signals are stored the instrument may include means for transmitting signals to a receiver when predetermined actions have been completed by a user, for example either periodically or when an item of writing such as a signature has been completed. The means for transmitting signals may include electrodes adapted to make contact with an interface when the instrument is placed in a certain position or the interface may, for example, employ electromagnetic or ultrasonic coupling. Alternatively signals from the light sensitive device may, after storage, or during generation, be passed from the writing instrument to an analyzer by way of a connection or by way of a sonic or ultrasonic link or by way of a radiative link employing, for example, infrared signals or radio signals.

Means (separate from the light sensitive device) for receiving signals may also be included in the writing instrument to allow information held by the instrument to be updated. The updated information may be displayed by the instrument and updating may be subject to satisfactory signature or other validation.

Information for display or to reprogram the analyzing circuit may be passed to the instrument by modulating light from a source which illuminates the writing or drawing surface.

In addition the writing instrument may contain means for indicating the result of analysis carried out by the circuit contained by the pen and/or means for manually changing operations carried out by the circuit.

The circuit may be programmed and/or constructed to allow changes in function to be carried out by means of signals transmitted by light by way of the tip. Such signals may be generated by recognition by the pen of characters written or by sweeping the pen over a pattern of lines, for example a bar code.

The writing instrument may have a reservoir for ink and a valve for allowing ink to flow over the tip from the reservoir when pressure is applied to the tip.

According to a third aspect of the present invention there is provided apparatus for use in obtaining information when writing or drawing is carried out using a writing instrument which transmits electromagnetic radiation through a writing tip, the apparatus comprising a surface on which writing or drawing can be carried out or on which material for writing or drawing can be placed, and means for receiving light from the said tip either by way of reflection from the surface or from material placed on the surface, or by transmission through the surface or the said material, the surface containing marks which are at least partially opaque to light from the tip if the surface is intended for writing or drawing.

Preferably, in this form of the invention, the surface is transparent or translucent and the light sensitive device is positioned at the side of a sheet forming the surface or below the said surface where it can receive light from substantially the whole of the area containing the said marks.

According to a fourth aspect of the present invention there is provided a method of analyzing drawing or writing comprising using an instrument to draw or write on a marked surface.

deriving, within the instrument, a signal indicative of the occurrence of mark crossings while drawing or writing is carried out, and analyzing the said signal.

According to a fifth aspect of the present invention there is provided a writing instrument comprising means for sensing mark crossings made by a tip of the instrument on a marked surface, and means for deriving a signal representative of the said crossings.

As with the first aspect of the invention the surface may be marked for the fourth and fifth aspects by projecting light to provide light and dark areas.

The invention includes apparatus corresponding to the method of the fourth aspect of the invention and methods corresponding to the fifth aspect.

BRIEF DESCRIPTION OF THE DRAWINGS

Certain embodiments of the invention will now be described by way of example with reference to the accompanying drawings, in which:

FIG. 3 is a cross-section of another writing instrument according to the invention.

DESCRIPTION OF THE ILLUSTRATIVE EMBODIMENTS

Figure 1:
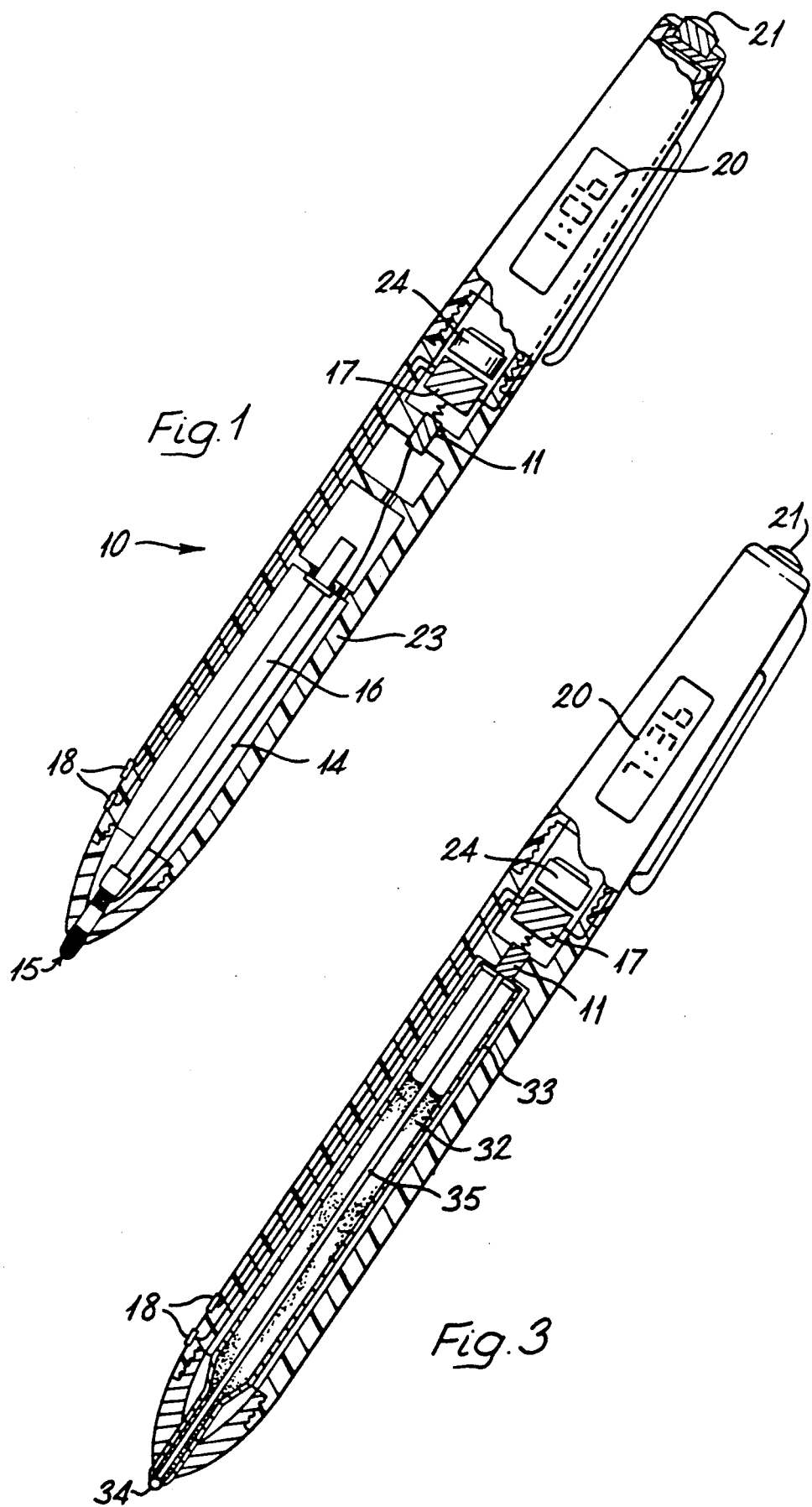
FIG. 1 is a cross-section of a writing instrument according to the invention.
Figure 2:
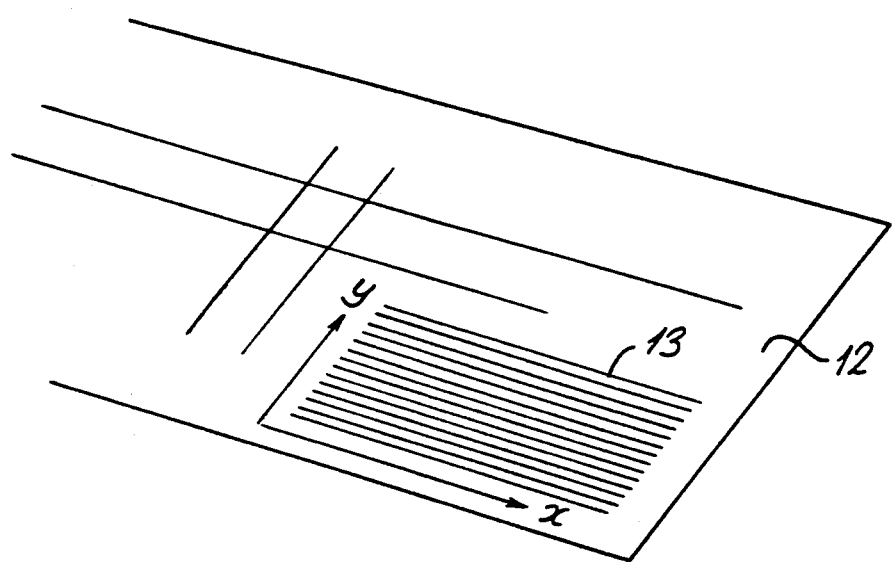
FIG. 2 illustrates a surface which may be used with the writing instrument of FIG. 1.

In FIG. 1 a pen 10 includes a light sensitive detector 11 which, when the pen is used to write on paper 12 (FIG. 2) having a grid of opaque lines 13 receives light reflected from the paper interrupted by crossing the lines in accordance with the way in which the pen moves across the paper. The pen has a tip 15 formed by a bundle of fibers which act as a writing tip receiving ink from a reservoir 16 by capillary action in which the ink moves down and/or between the fibers in the known way. At least one of the fibers in the bundle bypasses the reservoir 16 at 14 and channels light from the tip to the light sensitive detector 11. The fibers may be those used in known fiber tip or "fine line" pens; for example nylon fibers, but the light transmitting fiber of fibers may be glass fibers where the other material does not have sufficiently good light transmitting properties. The reservoir 16 is again conventional for fiber pens and is, for example, a cylindrical mass of absorbent felt or sponge-like material. Light received by the pen may be ambient but the paper 12 may be illuminated by a light source (not shown) (which may be part of the pen) so that fluctuations in the ambient light do not affect the light signal received by the light sensitive detector 11. The light source may be an infra-red source.

Where the pen is used for signature verification, for example if the paper 12 is a cheque and the lines 13 are printed on the cheque where the signature is to be written, both static and dynamic features of the signature are available in the electrical signal at the output from the detector 11. The size of one portion of the signature relative to another (e.g. relative number of lines crossed in the two portions) is an example of a static feature while the number of lines crossed per unit time in forming a part of the signature provides an example of a dynamic feature. Analysis of such features in signature recognition is a well known technique, see for example British Patent No. 1480066.

Two examples of techniques which may be employed in deriving a signal representative of a signature are 'event sampling' and 'time sampling'. In the former, the times at which events, that is line crossings, occur are determined using a high speed clock circuit. and in the latter the output of the light sensitive detector 11 is sampled at a high sample rate, for example every 1/100$^{th}$ second. and stored. A 'low' output may occur when a line is sensed and 'high' outputs would then be generated between lines.

Preferably the person signing is asked to sign on a baseline, which is clearly marked, and in a given direction which is normally generally parallel to the lines.

In signature verification it is usually desirable that the trail left by the pen is visible but in some circumstances the ink used may be of a type which is visible only in light of specific wavelengths such as ultra-violet or after heating or on application of a substance which "develops" the trail.

The output from the detector 11 may be taken with or without amplification from the pen by means of a connection (not shown) to a computer for signal analysis, such as signature verification. However as shown in the present example it is preferable to eliminate any connection from the pen which may hamper writing and signing. For this reason the pen 10 includes an integrated circuit 17 powered by a battery 24 and connected to the detector 11. The circuit 17 may either carry out an analysis of the output, for example for signature verification when it includes a microprocessor or a gate array, or it may simply store the signals received, usually in digital form. If storage only is carried out, then after writing has been completed the pen may be placed in a special purpose stand (not shown) where electrodes 18 on the pen make contact with corresponding electrodes in the stand allowing transfer of the digitally stored signal for analysis by a computer coupled to the stand. The contacts 18 may be replaced by an electromagnetic induction link, a radio link, an ultrasonic link or ultra-violet or infra-red links.

In such an arrangement the pen can be very inexpensive and the computer, which is relatively costly, can service many "stands", i.e. data entry points. Thus an economical arrangement is achieved.

In some circumstances the battery 24 may be replaced by a capacitor, for example where a capacitor can be charged from the stand by way of contacts.

The pen shown in FIG. 1 includes a liquid crystal, or light emitting diode, display 20 which may be used to provide an output from the integrated circuit 17; for example giving instructions to the writer or giving the result of signature verification. The display 20 may be used for other purposes; for example to display a code indicating a function carried out by the circuit 17 and this function may be controlled by a microswitch 21 which, when present, is located at the top of the pen. A function which may be provided is that of a calculator when the integrated circuit 17 includes a microprocessor. Numbers and characters written by the pen are recognized and the result is displayed. For example "6×3" could be written and the display would then show "18".

Part of the pen. for example the top, or further internal integrated circuits, may form plug-in modules for signal storage or program purposes, such as signature verification, text processing, telephone number storage (where entry to the store is by a name written by the pen and the number is displayed by the display 20) or mathematical calculations.

When verification is carried out by the circuit 17 it is usually necessary to provide means for communicating the result of verification to other apparatus for example to allow or curtail the transfer of funds. Such communication may be as described above.

The ink is substantially transparent to at least some wavelengths of light received by the detector 11 and this is in contrast with the ink used to print the lines 13 which is opaque to such wavelengths.

Figure 5A:
Figure 5B:
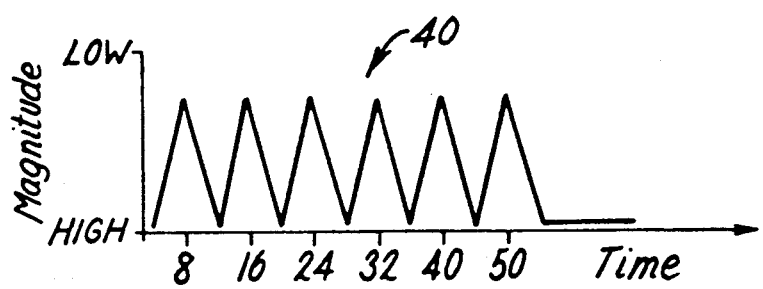
Figure 5C:
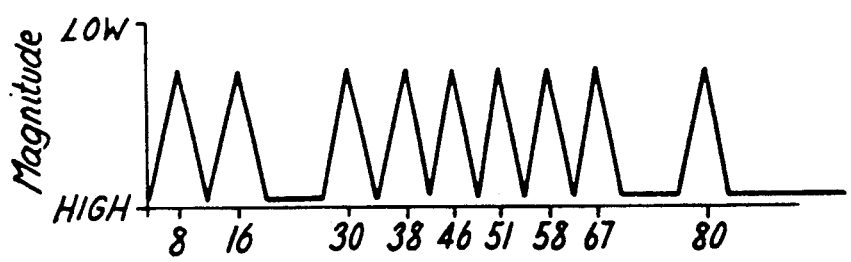
Figure 6:
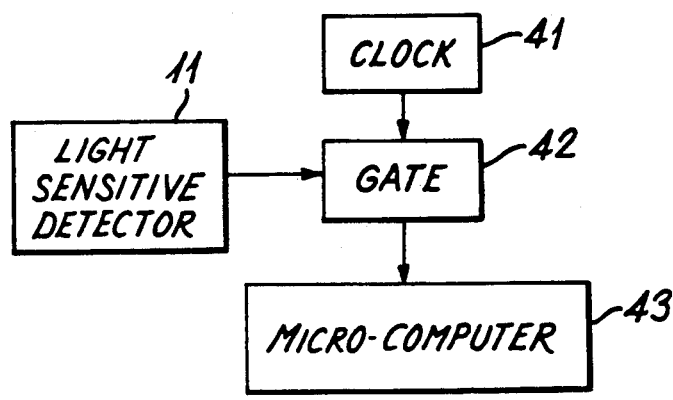
FIG. 6 is a block diagram of apparatus for such analysis.

An example of the usage of the signals derived in the 'event sampling' mentioned above in temporal analysis for data entry is now given with reference to FIGS. 5 (a) (b) and (c) (where the peaks indicate low magnitudes and the toughs indicate high magnitudes) and FIG. 6. If a "one" is written across the lines of FIG. 5(a) as a steady downstroke, a series of pulses 40 approximately evenly spaced in time results. Assuming a clock circuit 41 starts when the pen touches the paper, as sensed by a light level change at the light sensitive detector 11, the peaks of these pulses might occur at the times shown by arbitrary units along the horizontal axis of FIG. 5(b). If a gate 42 is arranged to operate when a peak is detected. the times shown are gated to a microcomputer 43 which may form part of the integrated circuit 17 or part of a computer remote from the pen (which may then include the clock 41 and the gate 42). If now the number 2 shown in FIG. 5a is written, the pulse train of FIG. 5(c) may result with pauses after the first two pulses and before the last pulse, probably caused by inertia of the hand on changing direction.

The sets of pulses, and the times of their peaks, are distinct for the two numbers, and the times of peaks can be analyzed by the microcomputer 43 to indicate which number has been written. Analysis may, for example, include calculating the following for each number written:

(a) Total time that the pen is in contact with the paper (that is 50 for a "one" and 80 for a "two")

(b) Total number of pulses (c) The average pulse frequency (that is number of pulses divided by total time), and (d) An analysis of the intervals between peaks (for example mean interval, standard deviation, distribution of long and short intervals).

The lines may have significant width when the durations of the intervals in which the pen is in contact with lines and between lines, respectively, are preferably used in carrying out the temporal analysis. Time measurement is then triggered by the changes in level of light received by the pen when boundaries between lines and spaces are crossed.

Many other forms of analysis will be apparent to the informed reader such as other statistical procedures and Markov modelling.

The analyzed pulse patterns may be compared with stored vectors representing characters to be recognized in order to determine characters which have been written.

Similar procedures may be used for signature recognition although pulse patterns are more complicated and other characteristics can also be used in recognition. The stored vectors, in this case representing signatures to be recognised, are obtained (for example by the techniques mentioned above) from signatures written to "train" a recognizer. Such training procedures are well known.

Pens constructed as above may have a resolution of 1/72 of an inch or better giving a suitable number of line crossings (usually at least six) when a normal sized character is handwritten on paper having lines corresponding to this resolution (for example 36 lines per inch).

An alternative and usually preferable pen is shown in FIG. 3. In order to improve reception by the pen and to eliminate as far as possible all light except that reflected from the paper in the vicinity of the pen tip, the tip is formed by a convex-convex lens 34 which is in close proximity to a light guide 35 coupling the lens to the detector 11. The lens may be a sphere which forms a rolling ball-point for the pen. Ink 32 is held in a replaceable cartridge 33 which may include the transparent ball tip 34 and the central light guide 35. Where the material of the outer wall of a cartridge or the ink is sufficiently transparent or translucent to light received by the detector 11, the guide 35 may be omitted. The ball tip need not be part of the cartridge and may be in one of the usual forms for a ball pen. for example a roller ball in which the ball is pressed from the exterior of the pen into a nylon or plastics moulding, or a ball point where the ball is retained in a metal housing.

Figure 7A:
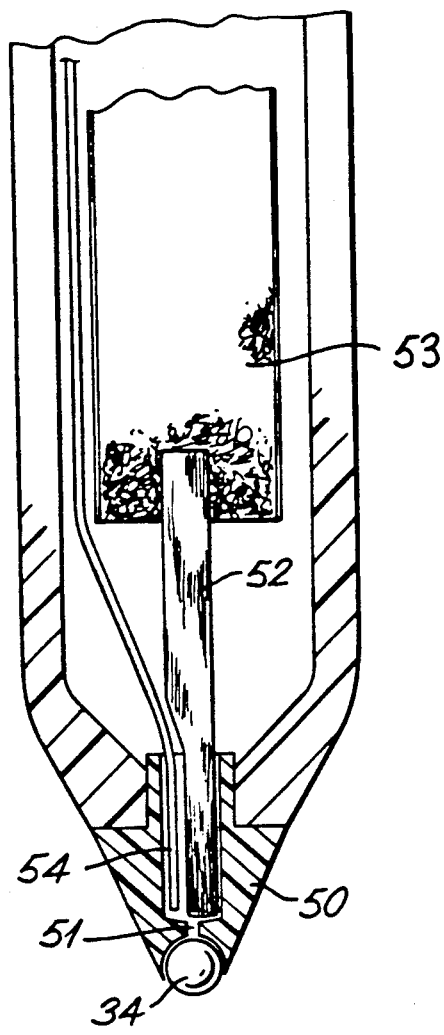
FIGS. 7a and 7b show cross-sections of the tips of alternative writing instruments according to the invention.
Figure 7B:
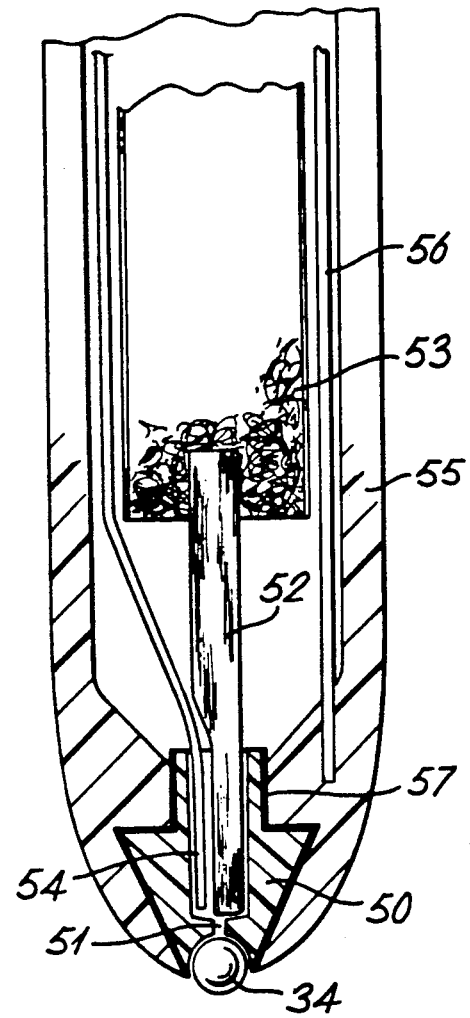

Other arrangements in which the rolling ball is formed by a transparent ball 34 acting as a convex-convex lens are shown in FIGS. 7a and 7b. The ball 34 is "popped" into a transparent or translucent plastics member 50 which has a channel 51 allowing ink to run over the ball from a wick 52. Ink is held in a reservoir 53 filled with absorbent felt and the wick 52 projects from the reservoir to a point adjacent to the channel 51. Light picked up by the ball 34 is transmitted through the transparent or translucent member 50 to a light guide 54 which is coupled at its end remote from the ball to the detector 11 (not shown in FIGS. 7a and 7b). The wick 52 is shaped as shown at its lower end to allow the guide 54 to enter the upper recess in the member 50.

In some applications it may be advisable or convenient to supply light to the writing surface from the pen since a strong light signal can then be received, for example by the detector 11. In FIG. 7b light is supplied to a translucent or transparent pen body 55 from a source (not shown) such as a light emitting diode or a miniature incandescent lamp in the pen, or a flexible light guide coupling an external light source to the body 55. In each of these examples a light guide 56 may be used to couple the source to a portion of the body 55 near the ball 34 or if the body is transparent or translucent it can act as the light guide. It is important that only light travelling from the paper by way of the ball 34 reaches the detector 11 and for this reason the member 50 is coated with opaque material 57 and the outside of the light guide 54 and/or the interior of the body 55 are similarly coated.

Figure 8:
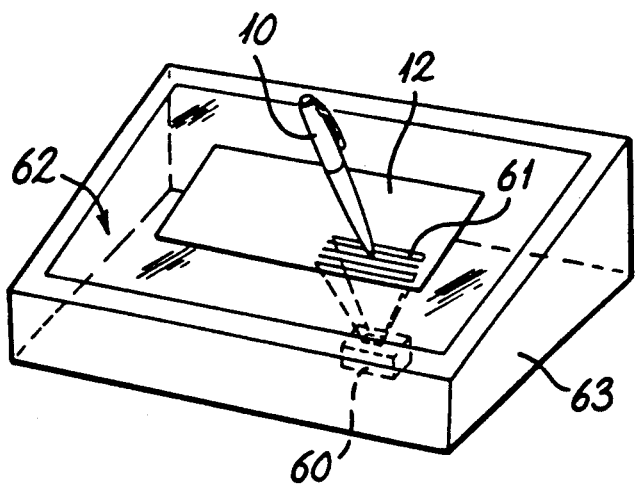
FIG. 8 illustrates an arrangement according to the invention in which lines are projected on to a writing surface.

As an alternative to using a grid of lines printed on the paper 12. plain paper may be used with the lines projected on to the paper as shown in FIG. 8. A light source 60 contains a grid, or graticule with ruled lines, and, preferably, a lens system. The source 60 also contains a mask so that lines which appear on the paper 12 when light is projected through the grid or graticule are confined to an area 61. The pen 10 receives modulated light through the paper when, for example a signature is written on the area 61. The paper 12 is supported on a transparent or translucent surface 62 forming the top of a box 63 containing the light source 60.

Lines may, instead, be projected on to plain paper from above the paper provided neither the pen nor a hand holding the pen shade the point where the pen tip makes contact with the paper.

A further alternative is to apply a slotted mask to either side of the surface 62 or to include such a mask in the surface 62 and project light of uniform intensity from the light source 60.

Figure 4:
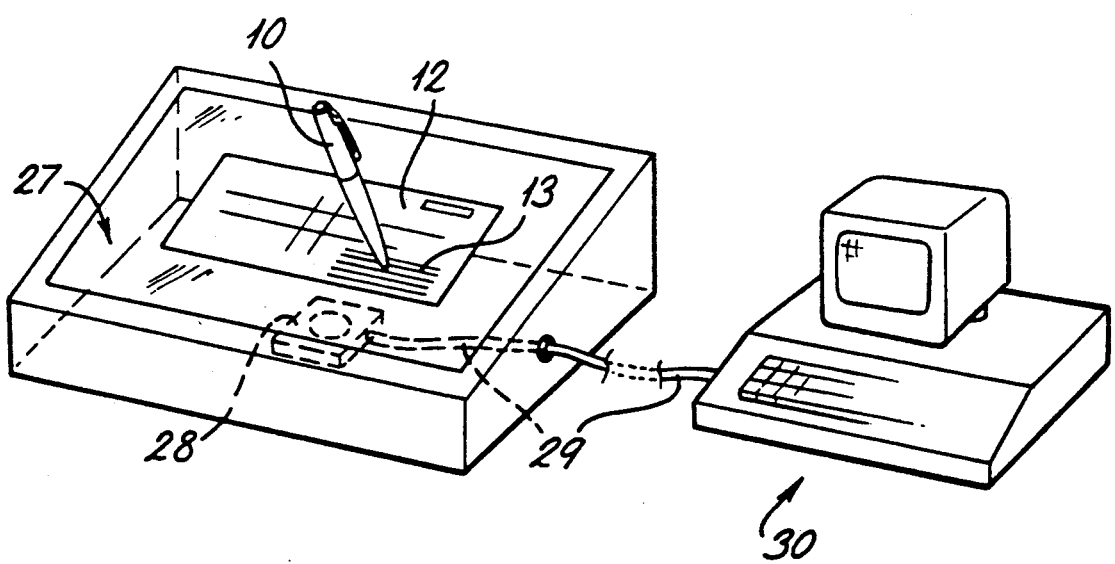
FIG. 4 illustrates a signature-verification terminal according to the invention, FIGS. 5(a), (b) and (c) are diagrams illustrating temporal analysis.

In another embodiment of the invention the light sensitive detector 11 is replaced by a light source, such as an infra-red source and the integrated circuit 17 is omitted. In use the paper 12 is reasonably transparent or translucent to light from the source in the pen but the lines 13 are not. Also the paper 12 is placed on a surface 27 (see FIG. 4) which is transparent or translucent to the light and a light sensitive detector 28 receiving light from the whole area containing the lines 13 is positioned under the surface. The detector 28 is connected by way of a connection 29 to a computer 30. As the ball 34 of the pen of FIG. 3 passes over the lines 13 light to the light sensitive detector under the surface is interrupted and the signal from the detector 28 is analysed by the computer 30, for example for signature verification. A lens such as a Fresnel lens may be used to focus light from the source on to the detector 28.

The detector 28 may, as an alternative, be placed closely adjacent to one edge of a sheet of material forming the surface 27. Light from the pen is then transmitted to the detector by refraction and internal reflection. In such an arrangement the box shown in FIG. 4 may not be required since the sheet may be placed directly on a supporting surface, with the detector 28 at one side.

In a further alternative the light sensitive detector 11, or light source, and the light guide 35 are replaced by an inductor (not shown) having an inductance which is affected by the material used in printing the lines 13. For example the lines may be printed in ferromagnetic ink and the replacement for the guide 35 may be a ferromagnetic core for the inductor which has one end positioned just above the ball 34 which in this embodiment is metallic. The circuit 17 is now constructed to respond to changes in the inductance of the coil and, as before, this circuit may be coupled by way of a connection between the pen and analyzing circuits. Alternatively the circuit may store signals representative of inductance changes per unit time for access when writing has ceased by way of a special purpose stand, or for analysis within the circuit 17 of the pen. As mentioned above even where analysis is carried out within the pen it is usually necessary to make some contact with other apparatus in order to allow or prevent a process, such as funds transfer, from being carried out. The display 20 or another display on the pen may indicate that a transaction may be carried out.

The invention is also useful in granting access to restricted areas. In this application a position for writing a signature or a codeword may be positioned outside an entrance and the microswitch 21 may be replaced by an infra-red emitter or radio transmitter which generates a signal representative of a digitized version of the signal received by the light sensitive detector 11, the digitized version being stored by the integrated circuit 17. At the beginning of each day or other convenient time period the holder of the pen is required to write his signature, the stored contents of the circuit 17 being automatically dumped at the end of the chosen period. However once the output from the infra-red emitter has been recognized as representing an authorized signature or code the pen can be used to gain access again without writing a signature simply by causing the infra-red emitter or radio transmitter to transmit signals based on the stored signals held by the circuit 17.

The pen may include an infra-red, or other receiver, and may store information which is updated by way of the receiver. For example the pen may store a personal balance, and when access is authorized by a signature formed using the pen at a terminal the stored information may be updated by transmissions from the terminal, and indicated using the display 20.

In the previous application and in others the optical components of the pen may be used to read a bar code and the bar coding may be employed in reprogramming the integrated circuit 17. A bar code may also be read when the light detector is beneath the writing surface as in FIG. 4, transparent material on which the bar code appears then being placed on the surface. This facility may be used for many purposes including a change of the access code mentioned above. The code may comprise a signature plus a personal identification number which is reprogrammable as indicated. If the code written does not match the most recently entered code the infra-red emission from the top of the pen does not provide access to the restricted area and may instead cause an alarm to be given.

The pen according to the invention also has application for data entry. For example if a numerical input only is required a grid of lines 13 can be positioned on a paper form where an entry is required and the number of crossings of the grid is then sufficient to identify most of the digits as they are written on the form. Either of the two techniques mentioned above for deriving a signal representative of a signature may also be used to derive signals representative of the digits. Usually it will be most convenient in this application for the pen to be connected directly to processing circuits unless, of course, the arrangement of FIG. 3 is used, but where only a small amount of data is to be entered it can be stored in integrated circuit 17 and accessed when data entry has been completed. Bar code reading is useful in this application when a printed form is to be completed, since the pen may be passed over a bar code positioned on the form in front of the space where data is to be entered. The bar code may represent a question being asked and/or it may be used for data entry and/or in organizing the storage of data. Additionally the bar codes may represent screen or printer handling codes such as "carriage return".

The data capture technique can be extended to the entry of letters or other symbols.

The configuration of lines sensed may be other than that shown, for example parallel lines in another orientation or a rectangular grid giving information relating to movements in two directions may be used. Regular arrays of dots, particularly if arranged on a triangular or hexagonal basis, are also useful alternatives. Even an irregular but predetermined arrangement of lines or dots is suitable.

Preferably the two parallel sets of lines in a rectangular grid are in different respective colors. If the light source emits light in these two colors, lines in one direction transmit one colors while lines in the other direction transmit the other color, while both colors are transmitted at intersections. Two light sensitive detectors are used, in the pen, or in a terminal similar to that of FIG. 4, each sensitive to light of one of the colors only. Movement in one direction is signalled by interruptions in light received by one detector and in the other direction by interruptions at the other detector. The output signals of the two detectors allow movement in the two directions to be analyzed, for example by the circuit 17. Instead the color sensitive detectors may be external to the pen when the two color source is within the pen.

Direction information may also be obtained in a similar way from a grid in which the lines pass light polarized in respective directions, each detector being sensitive to light of one polarization only.

The directions in which lines or arrays of dots are crossed may be sensed, if there is some characteristic of the lines or arrays which causes the modulation of light received to vary with the direction in which the pen is moved. The lines may be in groups when the lines in each group are spaced irregularly; for example in a group of three lines two may be relatively close together. The pen will then sense two lines crossed in close succession and then another rather later when crossing in one direction, and the opposite sequence when crossing in the other direction. Alternatively the lines in each group may be color coded so that, for example, red and blue colors are sensed in close succession in one direction and blue and red in the other direction. Lines of differing widths (for example as few as two) may be employed in another arrangement.

In pens according to the invention the light source and/or light sensitive detector may be located in other positions. The detector and/or source may be placed near the tip, especially where the 'pen' does not dispense ink.

I claim:

1. A method of identifying information as writing or drawing is carried out, comprising the steps of:
    writing or drawing in relation to a surface having regularly shaped and spaced marks using a tip of an instrument which causes a trail to be left which can be traced,
    continually sensing for data relating to the tip crossing any of the marks by receiving light which varies as the marks are crossed the sensing being carried out substantially independent of the trail being left, storing the data in an electronic storage device as the data is continually sensed, and analyzing the data on a temporal basis, in which values dependent on the number of mark crossings per unit time are derived for identifying the said information.

2. A method according to claim 1, wherein sensing mark crossings is carried out from the same side of the surface as the instrument.

3. A method according to claim 1 wherein the writing or drawing is carried out with the tip in contact with the surface.

4. A method according to claim 1 wherein sensing is carried out by receiving light which is modulated by at least partial interruption when a said mark is crossed.

5. A method according to claim 4, including projecting light onto the surface, the light being received in the instrument in order to allow mark crossing sensing to be carried out.

6. A method according to claim 4, including projecting light from the writing instrument onto, or through, the surface, the light being received externally of the instrument in order to allow mark crossing sensing to be carried out.

7. A method according to claim 4 wherein the writing or drawing is carried out with the tip in contact with the surface and material dispensed from the tip forms the trail, and the material allows the said light to pass therethrough.

8. A method according to claim 4, including projecting light through the surface, the light being received in the instrument in order to allow mark crossing sensing to be carried out.

9. A method according to claim 1 including using the temporal analysis in recognizing or rejecting signatures written using the said instrument.

10. A method according to claim 1 including using the temporal analysis in recognizing symbols written using the said instrument.

11. A method according to claim 1 wherein the marks are parallel lines.

12. A method of identifying information as writing or drawing is carried out, comprising the steps of:

projecting light to provide a predetermined arrangement of marks at a surface where the marks are regularly spaced and the marks are regular in shape, writing or drawing in relation to the said surface marked in a predetermined way using a tip of an instrument which causes a trail to be left which can be traced, continually sensing for data relating to the tip crossing any of the marks by receiving light which varies as the marks are crossed the sensing being carried out substantially independent of the trail left, storing the data in an electronic storage device as the data is continually sensed, electronically analyzing the mark crossings on a temporal basis comprising deriving the values dependent on the number of mark crossings per unit time, and identifying said information using variations in the said values.

13. A method according to claim 12 including using the temporal analysis in recognizing symbols written using the said instrument.

14. A method according to claim 12 including using the temporal analysis in recognizing symbols written using the said instrument.

15. A method according to claim 12 wherein the marks are parallel lines.

* * * * *